United States Patent
Gil et al.

(10) Patent No.: US 8,510,609 B2
(45) Date of Patent: Aug. 13, 2013

(54) APPARATUS AND METHOD FOR RATE DEMATCHING IN A COMMUNICATION SYSTEM

(75) Inventors: Gang-Mi Gil, Suwon-si (KR); Min-Ho Shin, Suwon-si (KR); Hun-Kee Kim, Seoul (KR); Hwan-Min Kang, Suwon-si (KR); Chang-Hyun Kwak, Seoul (KR)

(73) Assignee: Samsung Electronics Co., Ltd (KR)

( * ) Notice: Subject to any disclaimer, the term of this patent is extended or adjusted under 35 U.S.C. 154(b) by 563 days.

(21) Appl. No.: 12/674,844

(22) PCT Filed: Aug. 22, 2008

(86) PCT No.: PCT/KR2008/004899
§ 371 (c)(1),
(2), (4) Date: Feb. 23, 2010

(87) PCT Pub. No.: WO2009/025516
PCT Pub. Date: Feb. 26, 2009

(65) Prior Publication Data
US 2011/0283169 A1    Nov. 17, 2011

(30) Foreign Application Priority Data
Aug. 23, 2007   (KR) .......................... 10-2007-0084725

(51) Int. Cl.
*G11C 29/00* (2006.01)
(52) U.S. Cl.
USPC ........................................ 714/702; 714/786
(58) Field of Classification Search
USPC ........................................ 714/702, 790, 786
See application file for complete search history.

(56) References Cited

U.S. PATENT DOCUMENTS

| | | | |
|---|---|---|---|
| 6,397,367 B1 * | 5/2002 | Park et al. ...................... | 714/786 |
| 2005/0201283 A1 * | 9/2005 | Yoon et al. ...................... | 370/232 |
| 2007/0189233 A1 * | 8/2007 | Park et al. ...................... | 370/335 |
| 2007/0245219 A1 * | 10/2007 | Yagihashi ...................... | 714/776 |
| 2007/0288834 A1 * | 12/2007 | Crozier et al. ................. | 714/790 |
| 2008/0002618 A1 * | 1/2008 | Murata et al. .................. | 370/329 |
| 2008/0256424 A1 * | 10/2008 | Shen et al. ...................... | 714/790 |
| 2009/0024680 A1 * | 1/2009 | Barry et al. ..................... | 708/100 |
| 2009/0119570 A1 * | 5/2009 | Eder et al. ..................... | 714/792 |
| 2010/0020893 A1 * | 1/2010 | Hoshino et al. ................ | 375/267 |

FOREIGN PATENT DOCUMENTS

| | | |
|---|---|---|
| KR | 1020000067738 A | 11/2000 |
| KR | 1020050087892 A | 9/2005 |
| KR | 1020070076247 A | 7/2007 |
| WO | WO99/65148 | 12/1999 |

OTHER PUBLICATIONS

Int'l Search Report PCT/ISA/210 (3pp), Jan. 29, 2009.

* cited by examiner

*Primary Examiner* — Joshua Lohn
(74) *Attorney, Agent, or Firm* — The Farrell Law Firm, P.C.

(57) ABSTRACT

An apparatus and method for rate dematching in a communication system are provided. The apparatus includes an input sequence generator, an error calculator, and a puncture/repetition determiner. The input sequence generator calculates if current input data among data, which are input in interleaved sequence, corresponds to any $n^{th}$ sequence among before-interleaved sequence. The error calculator calculates an error for the current input data using the calculated sequence. The puncture/repetition determiner determines type of the current input data using the error for the current input data.

22 Claims, 13 Drawing Sheets

Fig. 2

| PUNCTURE/REPETITION DETERMINATION RESULT ON PREVIOUS ERROR | ERROR OFFSET |
|---|---|
| PUNCTURE | $-e_{minus} + e_{plus}$ |
| PUNCTURE GENERAL | $-e_{minus}$ |
| REPETITION FIRST WRITE | $e_{plus}$ |
| REPETITION LAST WRITE | $-e_{minus}$ |
| REPETITION GENERAL | $-e_{minus}$ |

Fig. 3

| OPERATION MODE | CURRENT ERROR (e) | DETERMINATION RESULT ON CURRENT ERROR | DETERMINATION RESULT ON CURRENT ERROR |
|---|---|---|---|
| '0' INSERTION MODE | e > 0 | | PUNCTURE GENERAL |
| | e ≤ 0 | | PUNCTURE |
| COMPRESSION MODE | e > 0 | REPETITION FIRST WRITE | REPETITION LAST WRITE |
| | e ≥ 0 | REPETITION LAST WRITE/REPETITION GENERAL | REPETITION GENERAL |
| | | | REPETITION FIRST WRITE |

Fig. 9

| OPERATION MODE | ERROR | PREVIOUS PUNCTURE/REPETITION DETERMINATION RESULT | PUNCTURE/REPETITION |
|---|---|---|---|
| '0' INSERTION MODE | $e > 0$ | | PUNCTURE GENERAL |
| | $e \leq 0$ | | PUNCTURE |
| COMPRESSION MODE | $0 \leq e \leq (e_{plus} - e_{minus})$ | | REPETITION GENERAL |
| | | REPETITION FIRST READ | REPETITION LAST WRITE |
| | | REPETITION GENERAL/REPETITION FIRST WRITE/REPETITION LAST WRITE | FIRST REPEATED DATA |
| | $e < 0$ | REPETITION FIRST READ | REPETITION LAST WRITE |
| | $e > (e_{plus} - e_{minus})$ | REPETITION GENERAL/REPETITION FIRST WRITE/REPETITION LAST WRITE | SECOND REPEATED DATA |

APPARATUS AND METHOD FOR RATE DEMATCHING IN A COMMUNICATION SYSTEM

TECHNICAL FIELD

The present invention relates generally to an apparatus and method for rate dematching in a communication, system. More particularly, the present invention relates to an apparatus and method for calculating an error through a data input sequence and, before completion of deinterleaving, performing rate dematching in a communication system.

BACKGROUND ART

In a communication system, when there is a difference between number of data intended for transmission and number of data for actual transmission over a physical channel, a transmission side performs rate matching, thus matching the number of data intended for transmission with the number of data for actual transmission over the physical channel. That is, when the number of data intended for transmission is more than the number of data for actual transmission over the physical channel, the rate matching is performed by puncturing part of the data intended for transmission, thus decreasing the number of data intended for transmission. When the number of data intended for transmission is less than the number of data for actual transmission over the physical channel, the rate matching is performed by repeating part of the data intended for transmission, thus increasing the number of data intended for transmission. By doing so, the numbers of data can be matched with each other.

Thus, upon receiving the rate-matched data, a reception side of the communication system performs rate dematching to recover number of the data to the original. The rate dematching means inserting '0' into a punctured data position or compressing repeated data.

In general, a conventional communication system is constructed as in FIG. 1 and, upon rate dematching, operates in a '0' insertion mode for data punctured by a transmission side and operates in a compression mode for data repeated by the transmission side. The punctured data can be divided into a puncture and a puncture general. The puncture is data not input to a reception side because being punctured at a time the transmission side performs puncture. The puncture general is data input to the reception side because of not being punctured at a time the transmission side performs puncture. Also, the repeated data can be divided into a repetition first write, a repetition last write, and a repetition general. The repetition first write represents first input data among data repeated due to the execution of repetition of the transmission side. The repetition last write represents last input data among the repeated data. The repetition general represents data received to the reception side with no repetition.

FIG. 1 is a block diagram illustrating a construction of an apparatus for rate dematching in a communication system according to the conventional art.

Referring to FIG. 1, an error generator 101 sets an error initial value, adds an error offset to a previous error, and calculates a current error. The error offset is decided depending on the determination result of a previous error of a puncture/repetition determiner 103 as shown in FIG. 2.

The puncture/repetition determiner 103 determines the type of data corresponding to a previous error on the basis of the determination result on the previous error and a value of a current error (e) calculated by the error generator 101 with reference to FIG. 3.

An input buffer read position generator 105 designates an address to read data from an input buffer 111, that is, a read position using the determination result of the puncture/repetition determiner 103. The input buffer read position generator 105 sets a read position initial value of the input buffer 111 by '0'. The input buffer read position generator 105 adds '0' or '1' to a previous read position depending on the determination result of the puncture/repetition determiner 103 and generates a read position to read current data.

An output buffer write position generator 107 designates an address to write data in the output buffer 113, that is, a write position using the determination result of the puncture/repetition determiner 103. The output buffer write position generator 107 sets a write position initial value of the output buffer 113 by '0'. The output buffer write position generator 107 adds '0' or '1' to a previous write position depending on the determination result of the puncture/repetition determiner 103 and generates a write position to write current data.

An output selector 109 calculates a value of a combination of previous input data and current input data. After that, the output selector 109 outputs input data as it is, outputs '0', or outputs the calculated data value, depending on the determination result of the puncture/repetition determiner 103.

FIGS. 4 and 5 show a series of procedures for coding and decoding of a High-Speed Downlink Shared CHannel (HS-DSCH).

Referring to FIG. 4, a transmission side performs channel encoding 401, separates 403 information bits from parity bits, and performs rate matching 405, 407, and 409. Then, the transmission side gathers the information bits and parity bits through bit gathering 411, separates 413 the gathered bits by physical channel, performs HS-DSCH interleaving 415, performs constellation rearrangement 417 for data to be modulated into 16-Quadrature Amplitude (16QAM), and performs physical channel mapping 419 for transmission to a reception side. The procedure is performed for one subframe. The one subframe is transmitted over three slots.

Referring to FIG. 5, a reception side recovers 501 a 16QAM constellation rearrangement, completes HS-DSCH deinterleaving 503 by physical channel, performs bit separation 505, and stores bit separation data in a secondary rate dematching input buffer 507. If data of one subframe corresponding to the three slots are all stored in the secondary rate dematching input buffer 507, operations 509, 511, and 513 for secondary rate dematching are implemented. That is, as shown in FIG. 6, after data of one subframe are received over three slots, the reception side performs constellation rearrangement, HS-DSCH deinterleaving, and bit separation for the whole subframe and then, upon completion of the operations, performs an operation for rate-dematching.

As described above, a conventional rate dematching method has a problem that a delay time until before rate dematching is long because a reception side performs the rate dematching after data to be dematched are all received and deinterleaved.

Also, the conventional rate dematching method has a problem that the reception side inevitably requires an input buffer for storing the deinterleaved data and the use of the input buffer requires a clock for writing data in the input buffer and a clock for again reading the data from the input buffer, thus consuming double time compared to a non-storage method.

Lastly, the conventional rate dematching method has a problem that, when there is high-speed data transmission, number of data to be rate-dematched increases and therefore, the deinterleaving process consumes a longer time and a delay time gets longer, thus increasing a size of the input buffer.

DISCLOSURE OF INVENTION

Technical Solution

An aspect of the present invention is to substantially solve at least the above problems and/or disadvantages and to provide at least the advantages below. Accordingly, one aspect of the present invention is to provide an apparatus and method for rate dematching in a communication system.

Another aspect of the present invention is to provide an apparatus and method for reducing a process delay time taken until before a start of rate dematching execution in a communication system.

A further another aspect of the present invention is to provide an apparatus and method for calculating an error through a data input sequence and performing rate dematching in a communication system.

The above aspects are achieved by providing an apparatus and method for rate dematching in a communication system.

According to one aspect of the present invention, an apparatus for rate dematching in a communication system is provided. The apparatus includes an input sequence generator, an error calculator, and a puncture/repetition determiner. The input sequence generator calculates if current input data among data, which are input in interleaved sequence, corresponds to any nth sequence among before-interleaved sequence. The error calculator calculates an error for the current input data using the calculated sequence. The puncture/repetition determiner determines type of the current input data using the error for the current input data.

According to another aspect of the present invention, a method for rate dematching in a communication system is provided. The method includes calculating if current input data among data, which are input in interleaved sequence, corresponds to any nth sequence among before-interleaved sequence, calculating an error for the current input data using the calculated sequence, and determining type of the current input data using the error for the current input data.

BRIEF DESCRIPTION OF THE DRAWINGS

The above and other objects, features and advantages of the present invention will become more apparent from the following detailed description when taken in conjunction with the accompanying drawings in which:

FIG. 2 is a diagram illustrating an error offset upon execution of rate dematching in a communication system according to the conventional art;

FIG. 3 is a diagram illustrating a puncture/repetition determination method in a communication system according to the conventional art;

FIG. 9 is a diagram illustrating a puncture/repetition determination method in a communication system according to an exemplary embodiment of the present invention;

BEST MODE FOR CARRYING OUT THE INVENTION

Preferred embodiments of the present invention will be described herein below with reference to the accompanying drawings. In the following description, well-known functions or constructions are not described in detail since they would obscure the invention in unnecessary detail.

A technology for calculating an error through a data input sequence and, before completion of deinterleaving, performing rate dematching in a communication system according to an exemplary embodiment of the present invention is described below.

In an exemplary embodiment of the present invention, data are input to a rate dematching apparatus in interleaved sequence and thus, repeated data are not input successively, thereby not being able to internally store first input data among the repeated data. Accordingly, noticing the fact that first input data among the repeated data is stored in an output buffer, an exemplary embodiment of the present invention introduces a repetition first read of again reading the first input data among the repeated data stored in the output buffer at a time point of processing last input data among the repeated data. Thus, last input data among repeated data is processed through two steps: the repetition first read and a repetition last write. The repetition first read is a data process of reading first input data among repeated data from the output buffer. The repetition last write is a data process of combining read data with last input data among newly input repeated data. The two data processes are performed always continuously.

That is, for the purpose of rate dematching, the conventional art performs five types of data processes such as a puncture, a puncture general, a repetition first write, a repetition last write, and a repetition general, but an exemplary embodiment of the present invention additionally performs a data process that is a repetition first read.

Figure 1:
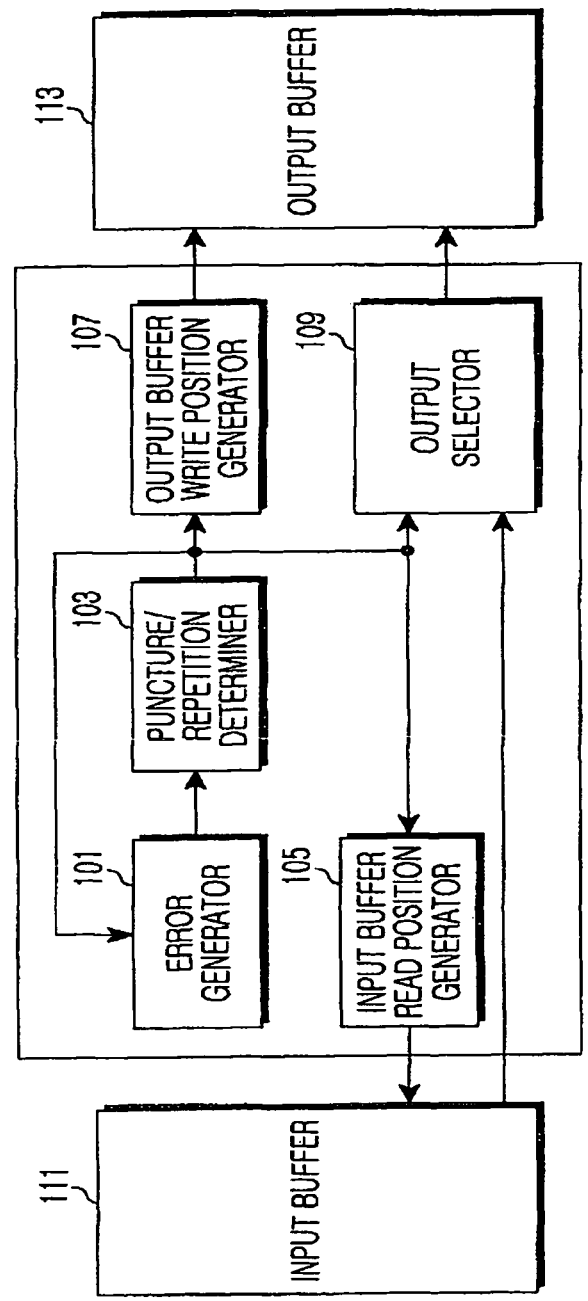
FIG. 1 is a block diagram illustrating a construction of an apparatus for rate dematching in a communication system according to the conventional art.
Figure 4:
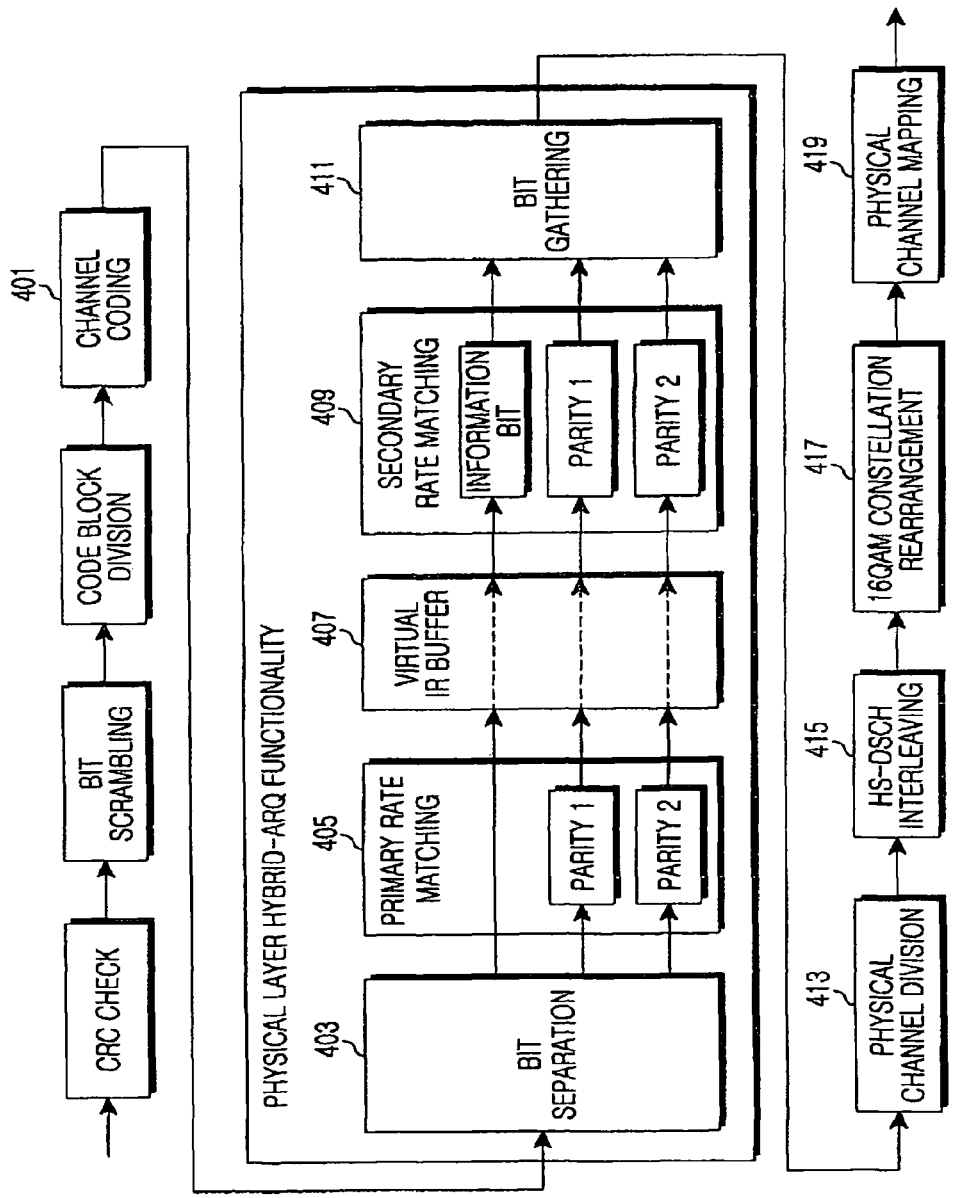
FIG. 4 is a block diagram illustrating a construction of a transmission side in a communication system according to the conventional art.
Figure 5:
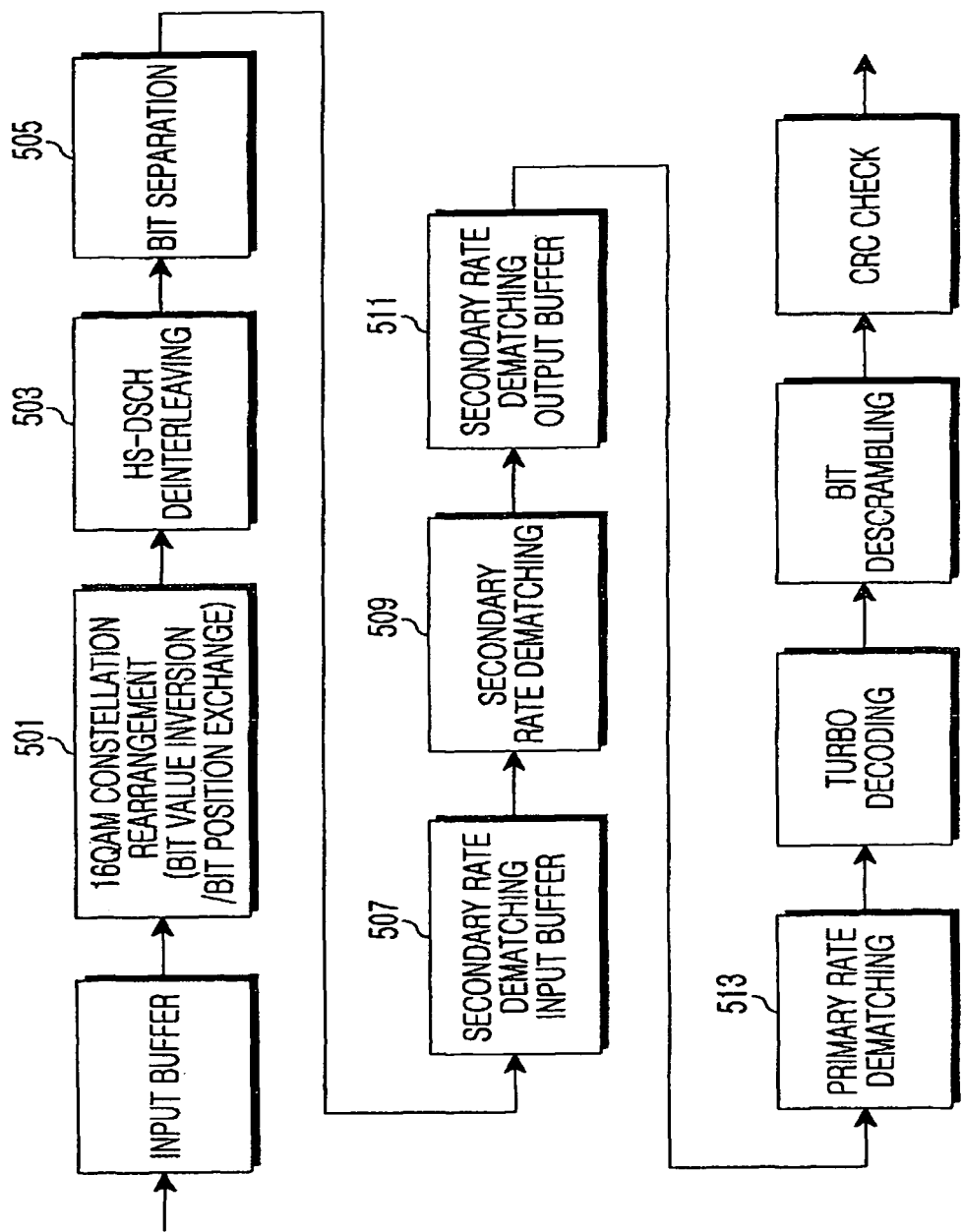
FIG. 5 is a block diagram illustrating a construction of a reception side in a communication system according to the conventional art.
Figure 6:
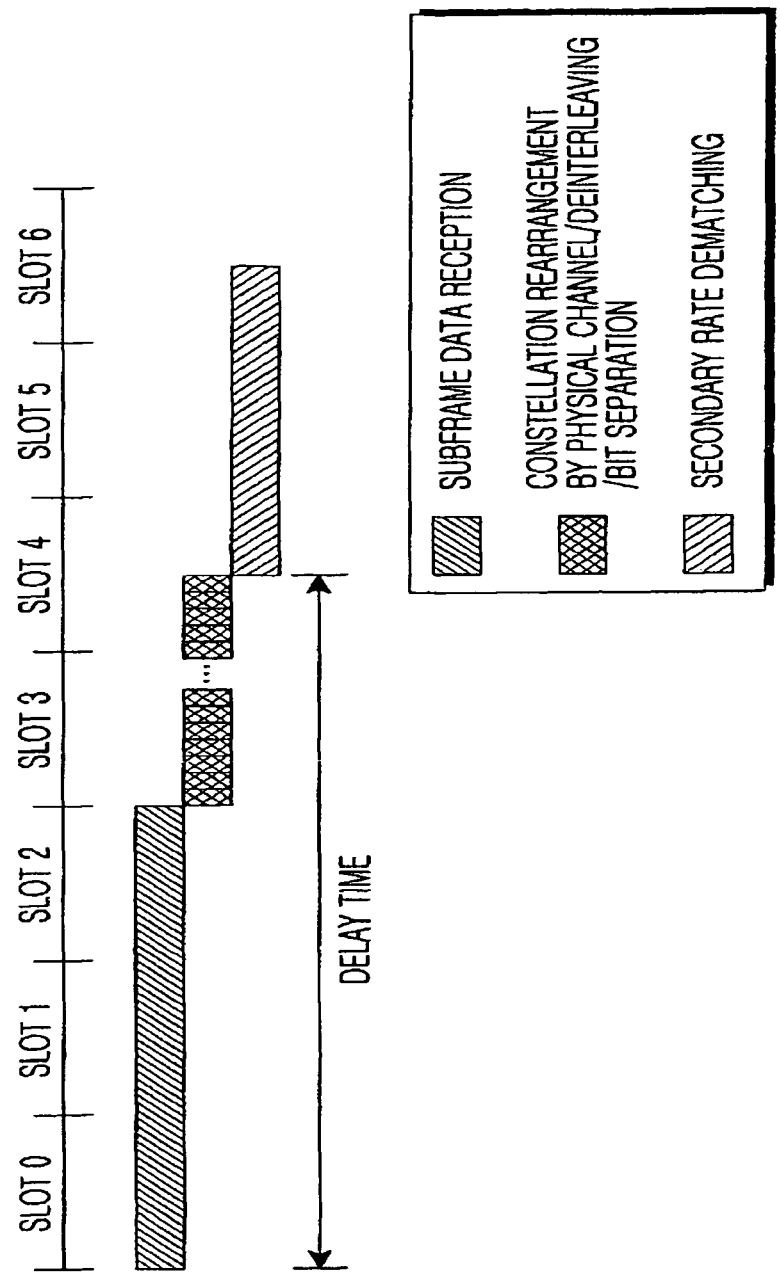
FIG. 6 is a diagram illustrating a start time of a rate dematching operation at a reception side of a communication system according to the conventional art.
Figure 7:
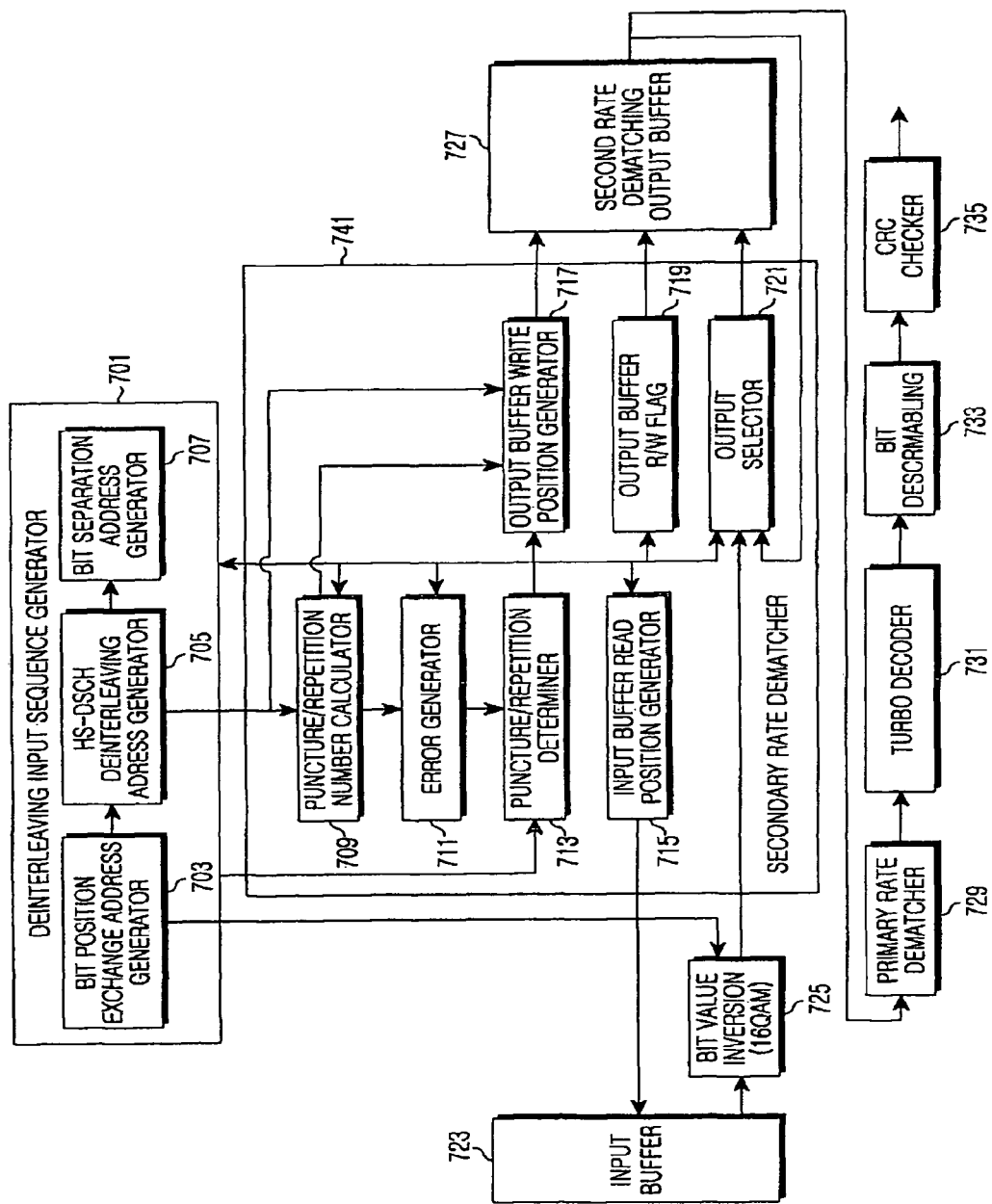
FIG. 7 is a block diagram illustrating a construction of a reception side in a communication system according to an exemplary embodiment of the present invention.

FIG. 7 is a block diagram illustrating a construction of a reception side in a communication system according to an exemplary embodiment of the present invention.

As shown in FIG. 7, the reception side includes a deinterleaving input sequence generator 701, a secondary rate dematcher 741, an input buffer 723, a bit value inverter 725, an output buffer 727, a primary rate dematcher 729, a turbo decoder 731, a bit descrambler 733, and a Cyclic Redundancy Check (CRC) checker 735. The deinterleaving input sequence generator 701 includes a bit position exchange address generator 703, a High-Speed Downlink Shared CHannel (HS-DSCH) deinterleaving address generator 705, and a bit separation address generator 707. The secondary rate dematcher 741 includes a puncture/repetition number calculator 709, an error generator 711, a puncture/repetition determiner 713, an input buffer read position generator 715, an output buffer write position generator 717, an output buffer Read/Write (R/W) flag 719, and an output selector 721.

The deinterleaving input sequence generator 701 generates an address after bit position exchange, an address after HS-DSCH deinterleaving, and an address after bit separation one by one using the bit position exchange address generator 703, the HS-DSCH deinterleaving address generator 705, and the bit separation address generator 707, thus calculating an input sequence of data that is input to the secondary rate dematcher 741 in interleaved sequence. That is, the deinterleaving input sequence generator 701 calculates if current input data among data input in interleaved and rearranged sequence corresponds to any nth sequence in an arrangement before rearrangement. The bit position exchange address generator 703 decides an inversion of a bit value of input data or not and provides the decision result to the bit value inverter 725.

The puncture/repetition number calculator 709 calculates if there is any number of punctured or repeated data prior to the current input data in the original sequence. In order to calculate the number of punctured or repeated data prior to the current input data, the puncture/repetition number calculator 709 first calculates a temporary error assuming that, upon sequential data input, there is no punctured or repeated data prior to current input data. The temporary error can be obtained, as shown in FIG. 2, by adding an error offset '$-e_{minus}$' of a puncture general or a repetition general to an initial value '$e_{ini}$' of an error by number of times corresponding to the input sequence. Then, the puncture/repetition number calculator 709 calculates if the error offset has to be added to the temporary error any times to give a value of more than the minimum value actually available by the error. The number of times of adding the error offset to the temporary error is equal to number of punctures or repetitions generated prior to the current input data. The minimum value actually available by the error is equal to '$-e_{minus}+1$'. This is because, upon rate dematching, the error offset '$-e_{minus}$' is repeatedly added to the initial error value '$e_{ini}$' and, whenever its resultant error is equal to '0' or a negative number, that is, whenever puncture or repetition is once generated, a positive error offset '$e_{plus}$' is added.

The puncture/repetition number calculator 709 adds an error offset '$e_{plus}-e_{minus}$' corresponding to a single puncture when the secondary rate dematcher operates in a '0' insertion mode that is a mode for processing data punctured by a transmission side, and adds an error offset '$e_{plus}+e_{minus}$' corresponding to a single repetition when the secondary rate dematcher operates in a compression mode that is a mode for processing data repeated by the transmission side.

The error generator 711 calculates a value of an actual error. When the puncture/repetition determination result on a previous error is a puncture, the error generator 711 calculates a current error by adding the error offset '$e_{plus}-e_{minus}$' corresponding to the single puncture to the previous error. When the puncture/repetition determination result is not a puncture, the error generator 711 calculates the current error by adding, by number of punctures or repetitions, an error offset corresponding to a single puncture or single repetition to a temporary error provided from the puncture/repetition number calculator 709. That is, upon operating in the '0' insertion mode, the error generator 711 adds the error offset corresponding to the single puncture to the temporary error by number of punctures and, upon operating in the compression mode, adds the error offset corresponding to the single repetition to the temporary error by number of repetitions, thus calculating the current error.

The puncture/repetition determiner 713 determines if it has to perform any one of six data processes, i.e., a puncture, a puncture general, a repetition first write, a repetition first read, a repetition last write, and a repetition general.

Figure 8:
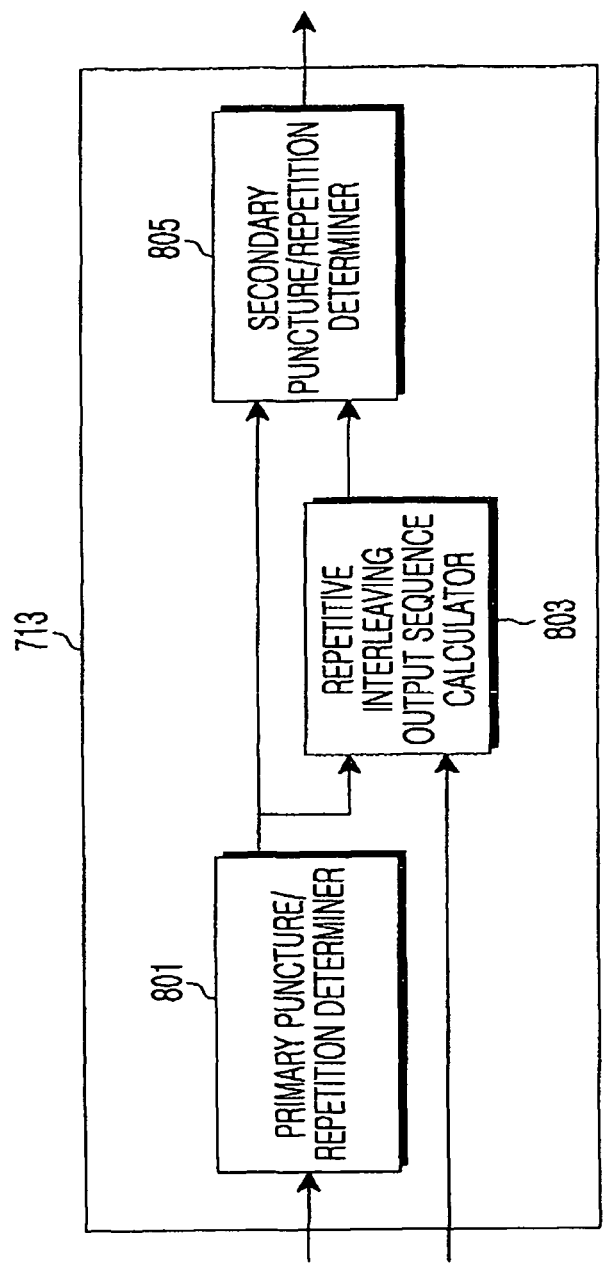
FIG. 8 is a detailed block diagram illustrating a construction of a puncture/repetition determiner of a reception side in a communication system according to an exemplary embodiment of the present invention.

The puncture/repetition determiner 713 includes a primary puncture/repetition determiner 801, a repetitive interleaving output sequence calculator 803, and a secondary puncture/repetition determiner 805 as shown in FIG. 8.

When operating in the '0' insertion mode, the primary puncture/repetition determiner 801 determines if data needing to be currently processed is a puncture or a puncture general on the basis of the current error value (e) with reference to FIG. 9. For example, in FIG. 9, when the current error value (e) is more than '0', the primary puncture/repetition determiner 801 can determine that the data needing to be currently processed is a puncture general and, when the current error value (e) is equal to or less than '0', can determine that the data needing to be currently processed is a puncture.

When operating in the compression mode, the primary puncture/repetition determiner 801 determines if corresponding data is first repeated data, second repeated data, or non-repeated data on the basis of the current error value (e) and the previous puncture/repetition determination result with reference to FIG. 9. For example, in FIG. 9, when the current error value (e) is more than '0' and the previous puncture/repetition determination result is a repetition general, the primary puncture/repetition determiner 801 can determine that the data needing to be currently processed is first repeated data.

The repetitive interleaving output sequence calculator 803 performs an operation only when the determination result of the primary puncture/repetition determiner 801 is first repeated data or second repeated data. That is, when the determination result is first repeated data, the repetitive interleaving output sequence calculator 803 calculates a reception sequence of second repeated data to determine if the second repeated data has been already received. The reception sequence of the second repeated data can be acquired in a method of calculating if data of a sequence corresponding to an 'output value+1' of the deinterleaving input sequence generator 701 is any $n^{th}$ output when being interleaved. When the determination result of the primary puncture/repetition determiner 801 is second repeated data, the repetitive interleaving output sequence calculator 803 calculates a reception sequence of first repeated data to determine if the first repeated data has been already received. The reception sequence of the first repeated data can be acquired in a method of calculating if data of a sequence corresponding to an 'output value−1' of the deinterleaving input sequence generator 701 is any $n^{th}$ output when being interleaved.

In the conventional art, because repeated data are input in successive sequence, second repeated data is input (i.e., a repetition last write) after first repeated data is input (i.e., a repetition first write). Unlike this, in an exemplary embodiment of the present invention, because data is input as interleaved, the repeated data are not input in successive sequence. Accordingly, when the repetitive interleaving output sequence calculator 803 determines that its determination result is first repeated data, the puncture/repetition determiner 713 identifies if second repeated data has been already input. When the second repeated data is not input, the puncture/repetition determiner 713 can determine and process the input first repeated data as a repetition first write and, when the second repeated data has been already input, can determine and process the input first repeated data as a repetition first read and determine and process its next input data as a repetition last write.

The secondary puncture/repetition determiner 805 outputs the determination result of the primary puncture/repetition determiner 801 as it is when the rate dematcher operates in a '0' insertion mode. The secondary puncture/repetition determiner 805 outputs the determination result of the primary puncture/repetition determiner 801 as it is or again performs a determination process depending on its determination result when the rate dematcher operates in a compression mode. That is, when the determination result of the primary puncture/repetition determiner 801 is a repetition general or a repetition last write, the secondary puncture/repetition determiner 805 outputs the determination result as it is. When the determination result of the primary puncture/repetition determiner 801 is first or second repeated data, the secondary puncture/repetition determiner 805 determines if the current input data is a repetition first write or a repetition first read through a comparison between a reception sequence provided from the repetitive interleaving output sequence calculator 803 and an input sequence of the current input data. When the input sequence of the current input data is less than the reception sequence, the secondary puncture/repetition determiner 805 determines the current input data as a repetition first write because the current input data among the repeated data is first input data. When the input sequence of the current input data is more than the reception sequence, the secondary puncture/repetition determiner 805 determines and outputs the current input data as a repetition first read because the current input data among the repeated data is last input data.

The input buffer read position generator 715 sets a read position initial value of the input buffer 723 by '0' and then, when the previous puncture/repetition determination result is a puncture or a repetition first read, adds '0' to a previous read position and when it is elsewhere, adds '1' to the previous read position, thus generating a read position value such that data of the input buffer 723 is read one by one. Here, it is to be noted that because maintaining the previous read position as it is by adding '0' to the previous read position is not inputting new data, the deinterleaving input sequence calculator 701 also has to maintain a deinterleaving input sequence output value for previous input data as it is. Also, the deinterleaving input sequence calculator 701 has to maintain an output value of the puncture/repetition number calculator 709 as it is.

The output buffer write position generator 717 generates a write position indicating if rate-dematched data is to be written in any position of the output buffer 727. When the rate dematcher operates in a '0' insertion mode, if the previous puncture/repetition determination result is a puncture general, the output buffer write position generator 717 outputs a sum of a deinterleaving input sequence and a punctured number and, if the previous puncture/repetition determination result is a puncture, adds '1' to a previous write position, indicating its next position. When the rate dematcher operates in a compression mode, the output buffer write position generator 717 always outputs a difference between a deinterleaving input sequence and a repeated number irrespective of the puncture/repetition determination result.

The output buffer R/W flag 719 newly introduced to an exemplary embodiment of the present invention decides whether to read data from the output buffer 727 or whether to write data in the output buffer 727 and informs the decision result of the output buffer 727. Only when the puncture/repetition determination result is a repetition first read, the output buffer R/W flag 719 informs "READ" of the output buffer 727. Elsewhere, the output buffer R/W flag 719 outputs "WRITE".

The output selector 721 selects and outputs data to be written in the output buffer 727. When operating in the '0' insertion mode, if the previous puncture/repetition determination result is a puncture general, the output selector 721 outputs input data as it is and, if the previous puncture/repetition determination result is a puncture, outputs '0'. When operating in the compression mode, if a current puncture/repetition determination result is a repetition general or a repetition first write, the output selector 721 outputs input data as it is and, if being a repetition first read, outputs nothing and, if being a repetition last write, combines data read from the output buffer 727 due to a repetition first read, which is implemented just before the repetition last write, with current input data and outputs the combined value.

Figure 10:
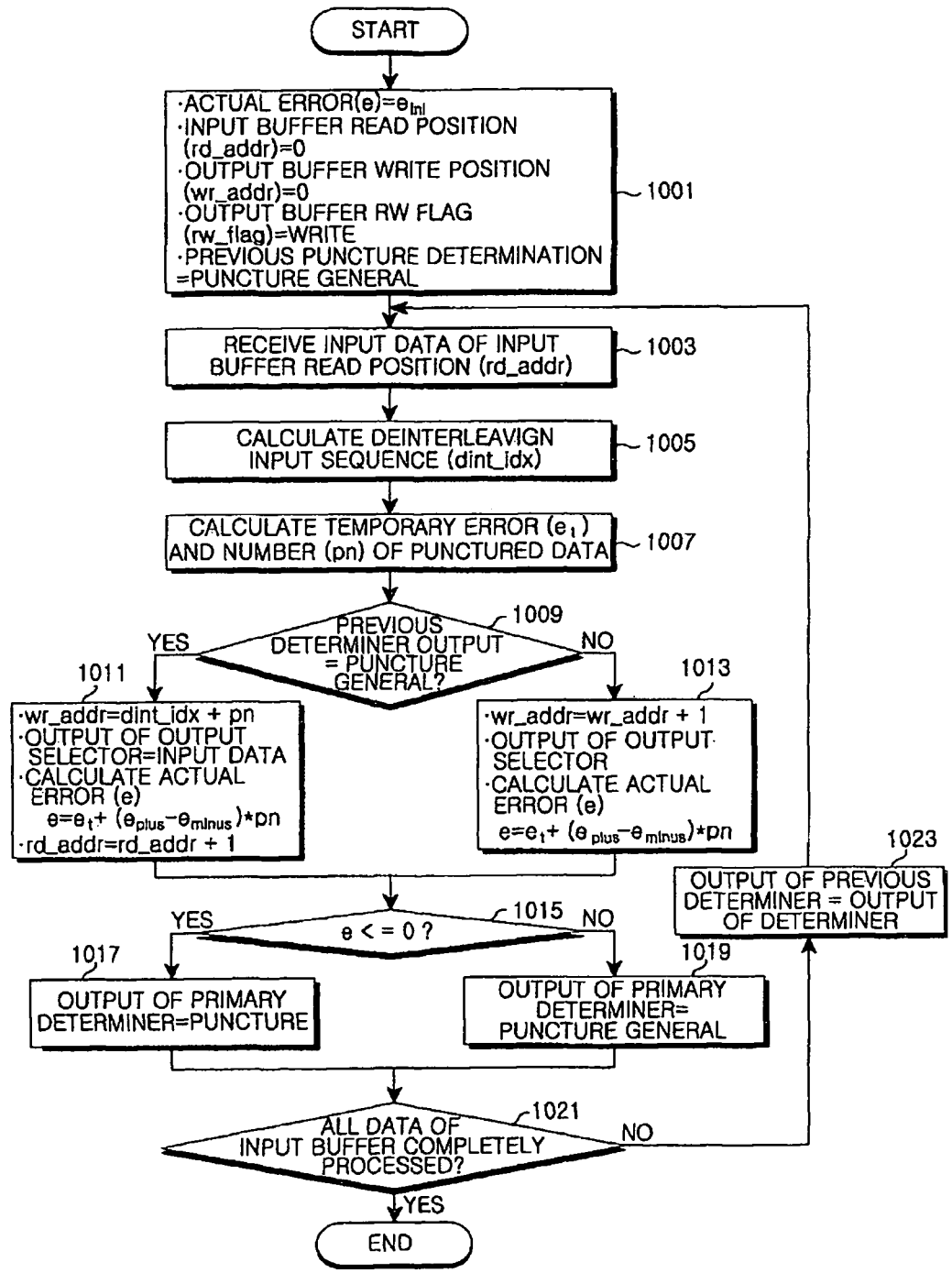
FIG. 10 is a flow diagram illustrating a process of recovering punctured data at a reception side of a communication system according to an exemplary embodiment of the present invention.

FIG. 10 is a flow diagram illustrating a process of recovering punctured data at a reception side of a communication system according to an exemplary embodiment of the present invention. Because a rate dematching operation is performed in a '0' insertion mode to recover punctured data, the repetitive interleaving output sequence generator 803 of FIG. 8 does not operate and the secondary puncture/repetition determiner 805 outputs the determination result of the primary puncture/repetition determiner 801 as it is.

Referring to FIG. 10, in step 1001, a reception side sets an actual error (e), a previous puncture determination result, an input buffer read position (rd_addr), an output buffer write position (wr_addr), output buffer RW flag information (rw_flag) and the like before performing a rate dematching operation. The reception side can set an initial value of the actual error (e) by '$e_{ini}$' and can set an initial value of the previous puncture determination result by a puncture general. The reception side can set the input buffer read position (rd_addr) and the output buffer write position (wr_addr) by '0', respectively, and can set the output buffer RW flag information (rw_flag) by 'WRITE'. The output buffer RW flag information (rw_flag) is always fixed to 'WRITE'.

Then, in step 1003, the reception side receives input data of a position, which is indicated by the input buffer read position (rd_addr), from an input buffer and, in step 1005, calculates an input sequence (dint_idx) of the input data.

Then, in step 1007, the reception side obtains a temporary error ($e_t$) for the input data and calculates number (pn) of data punctured before the input data. The temporary error ($e_t$) can be obtained, as shown in FIG. 2, by adding an error offset '$-e_{minus}$' for a puncture general to the error initial value '$e_{ini}$' by number of times corresponding to the calculated input sequence. Then, the reception side calculates if the error offset '$-e_{minus}$' has to be added to the temporary error ($e_t$) any times to give a value of more than the minimum value actually available by the error (e). The number of times of adding the error offset to the temporary error is equal to the number (pn) of data punctured before the input data.

Then, in step 1009, the reception side determines if the previous puncture determination result is a puncture general.

If the previous puncture determination result is a puncture general, in step 1011, the reception side updates the output buffer write position (wr_addr) by adding the number (pn) of punctured data to the calculated input sequence (dint_idx), writes the input data in a position indicated by the updated output buffer write position (wr_addr), and increases the input buffer read position (rd_addr) by '1'. And, the reception side calculates an actual error value (e) by adding an error offset ($e_{plus}-e_{minus}$) corresponding to a single puncture to a previous error value ($e_t$) by the number (pn) of punctured data and then, proceeds to next step 1015.

If the previous puncture determination result is not a puncture general, in step 1013, the reception side updates the output buffer write position by increasing the output buffer write position (wr_addr) by '1', writes '0' in a position indicated by the updated output buffer write position (wr_addr), and calculates an actual error value (e) by adding an error offset ($e_{plus}-e_{minus}$) corresponding to a single puncture to a previous error value ($e_t$) by the number (pn) of punctured data and then, proceeds to next step 1015. The input buffer read position (rd_addr) is maintained as it is.

Then, in step 1015, the reception side determines if a current data process operation is a puncture or a puncture general by determining if the calculated actual error value (e) is less than or equal to '0' with reference to FIG. 9.

If the actual error value (e) is less than or equal to '0', in step 1017, the reception side determines that the current data process operation is a puncture and, in step 1021, determines if all data of the input buffer are completely processed. If all the data of the input buffer are not completely processed, in step 1023, the reception side sets the determination result based on the actual error value (e) as a previous puncture determination result and then, returns to step 1003 and again performs its subsequent steps. If all the data of the input buffer are completely processed, the reception side terminates the process of an exemplary embodiment of the present invention.

If the actual error value (e) is more than '0', in step 1019, the reception side determines that the current data process operation is a puncture general and, in step 1021, determines if all the data of the input buffer are completely processed. If all the data of the input buffer are not completely processed, in step 1023, the reception side sets the determination result based on the actual error value (e) as a previous puncture determination result and then, returns to step 1003 and again performs its subsequent steps. If all the data of the input buffer are completely processed, the reception side terminates the process of an exemplar embodiment of the present invention.

Figure 11:
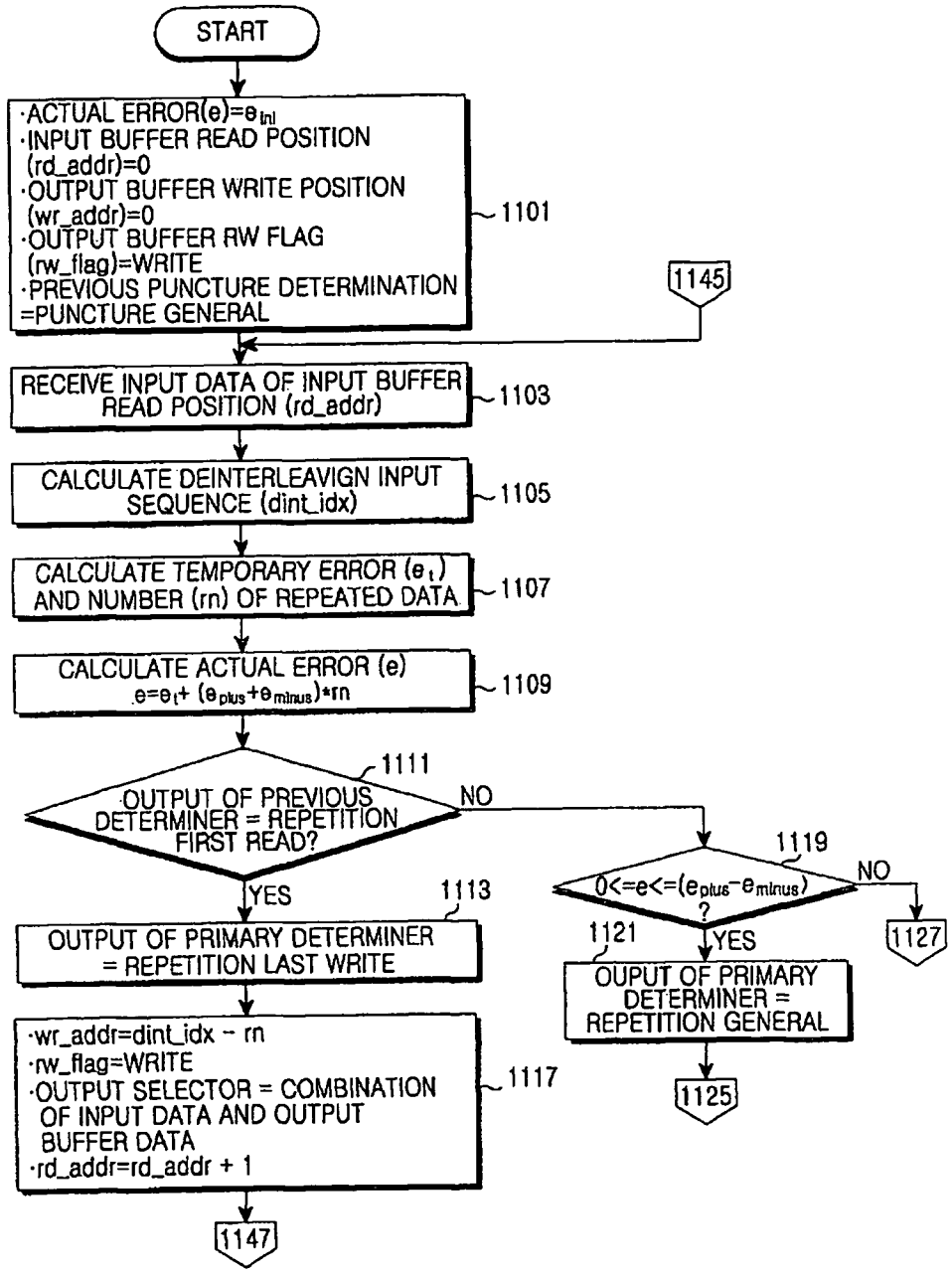
FIGS. 11 and 12 is a flow diagram illustrating a process of recovering repeated data at a reception side of a communication system according to an exemplary embodiment of the present invention.
Figure 12:
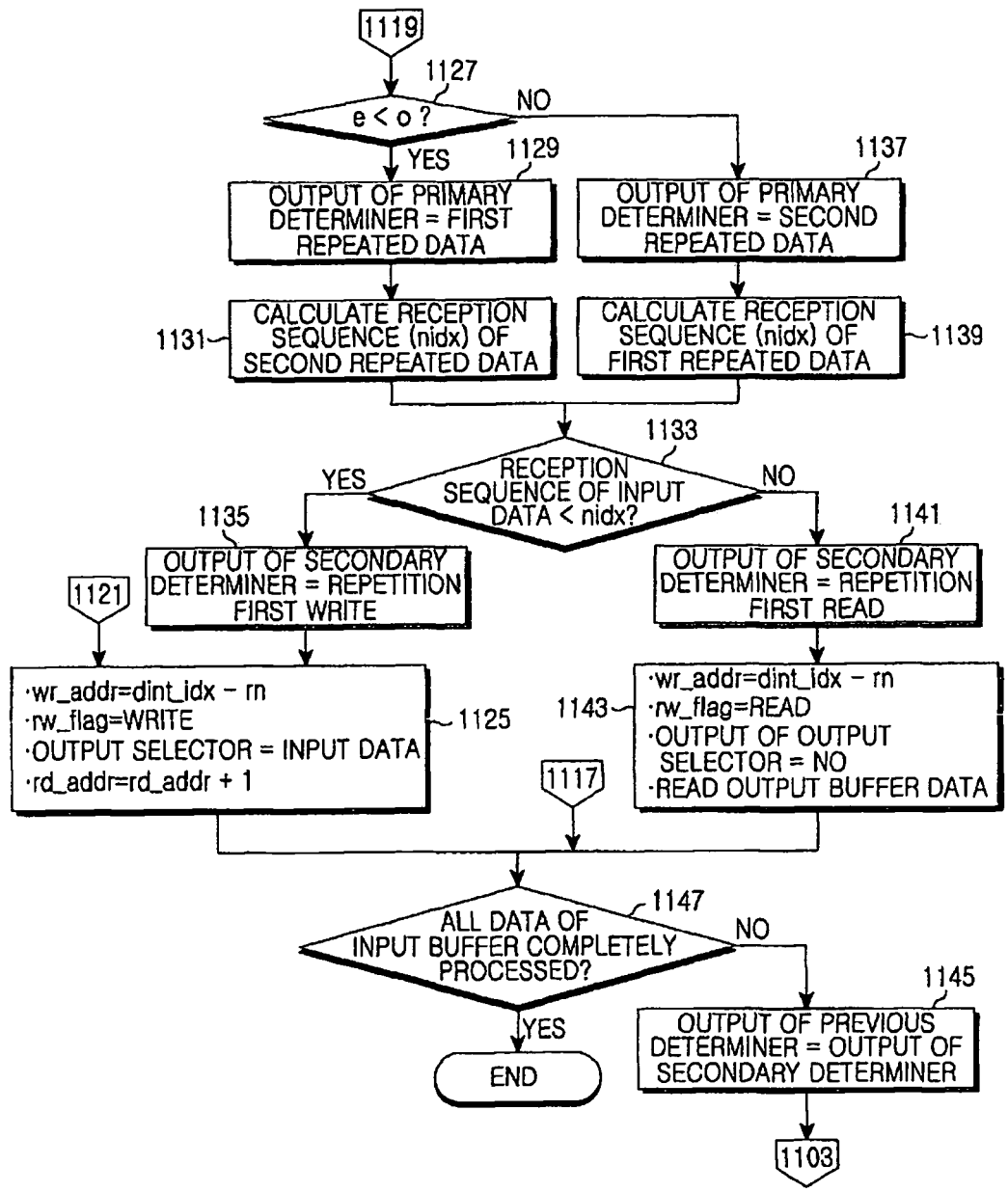

FIGS. 11 and 12 is a flow diagram illustrating a process of recovering repeated data at a reception side of a communication system according to an exemplary embodiment of the present invention.

Referring to FIGS. 11 and 12, in step 1101, a reception side sets an actual error (e), a previous repetition determination result, an input buffer read position (rd_addr), an output buffer write position (wr_addr), output buffer RW flag information (rw_flag) and the like before performing a rate dematching operation. The reception side can set an initial value of the actual error (e) by '$e_{ini}$' and can set an initial value of the previous puncture determination result by a puncture general. The reception side can set the input buffer read position (rd_addr) and the output buffer write position (wr_addr) by '0', respectively, and can set the output buffer RW flag information (rw_flag) by 'WRITE'.

Then, in step 1103, the reception side receives input data of a position, which is indicated by the input buffer read position (rd_addr), from an input buffer and, in step 1105, calculates an input sequence (dint_idx) of the input data.

Then, in step 1107, the reception side obtains a temporary error ($e_t$) for the input data and calculates number (rn) of data repeated before the input data. The temporary error ($e_t$) can be obtained, as shown in FIG. 2, by adding an error offset '$-e_{minus}$' for a repeat general to the error initial value '$e_{ini}$' by number of times corresponding to the calculated input sequence. Then, the reception side calculates if the error offset '$-e_{minus}$' has to be added to the temporary error ($e_t$) any times to give a value of more than the minimum value actually available by the error (e). The number of times of adding the error offset to the temporary error is equal to the number (pn) of data repeated before the input data.

Then, in step 1109, the reception side calculates an actual error value (e) by adding a repetition error offset ($e_{plus}+e_{minus}$) corresponding to a single repetition to a previous error value ($e_t$) by the number (rn) of repeated data and then, proceeds to next step 1111.

In step 1111, the reception side identifies if the previous repetition determination result is a repetition first read.

If the previous repetition determination result is a repetition first read, in step 1113, the reception side determines a current data process as a repetition last write with reference to FIG. 9. Then, in step 1117, the reception side updates the output buffer write position (wr_addr) by subtracting the number (rn) of repeated data from the calculated input sequence (dint_idx), combines the input data with data previously read from an output buffer and writes the combined data in a position indicated by the updated output buffer write position (wr_addr), and increases the input buffer read position (rd_addr) by '1' and then, proceeds to next step 1147. The output buffer RW flag information (rw_flag) is set as "WRITE".

If the determination result of step 1111 is that the previous repetition determination result is not a repetition first read, in step 1119, the reception side determines if the calculated actual error value (e) is greater than or equal to '0' and is less than or equal to a value of $e_{plus}-e_{minus}$.

If the actual error value (e) is greater than or equal to '0' and is less than or equal to the value of $e_{plus}-e_{minus}$, in step 1121, the reception side determines that a current data process is a repetition general with reference to FIG. 9. Then, in step 1125, the reception side updates the output buffer write position (wr_addr) by subtracting the number (rn) of repeated data from the calculated input sequence (dint_idx), writes the input data in a position indicated by the updated output buffer write position (wr_addr), and increases the input buffer read position (rd_addr) by '1' and then, proceeds next step 1147. The output buffer RW flag information (rw_flag) is set as 'WRITE'.

If the actual error value (e) is less than '0' or is more than a value of '$e_{plus}-e_{minus}$', in step 1127, the reception side determines if the actual error value (e) is less than '0'.

If the actual error value (e) is less than '0', in step 1129, the reception side identifies that a current data process is first repeated data with reference to FIG. 9 and, in step 1131, calculates a reception sequence (nidx) of second repeated data. Then, in step 1133, the reception side compares a reception sequence of the first repeated data with the reception sequence (nidx) of the second repeated data.

If the reception sequence of the first repeated data is less than the reception sequence (nidx) of the second repeated data, in step 1135, the reception side determines that a current data process is a repetition first write because the first repeated data is first input data. Then, in step 1125, the reception side updates the output buffer write position (wr_addr) by subtracting the number (rn) of repeated data from the calculated input sequence (dint_idx), writes the input data in the position indicated by the updated output buffer write position (wr_addr), and increases the input buffer read position (rd_addr) by '1' and then, proceeds next step 1147. The output buffer RW flag information (rw_flag) is set as 'WRITE'.

If the reception sequence of the first repeated data is more than the reception sequence (nidx) of the second repeated data, in step 1141, the reception side determines that a current data process is a repetition first read because the first repeated data is last input data.

Then, in step 1143, the reception side updates the output buffer write position (wr_addr) by subtracting the number (rn) of repeated data from the calculated input sequence (dint_idx), changes the output buffer RW flag information (rw_flag) into 'READ', and reads data of a position indicated by the updated output buffer write position (wr_addr) and then, proceeds to next step 1147.

If the determination result of step 1127 is that the actual error value (e) is not less than '0', that is, if the actual error value (e) is more than the value of '$e_{plus}-e_{minus}$', in step 1137, the reception side identifies that a current data process is second repeated data with reference to FIG. 9 and, in step 1139, calculates a reception sequence (nidx) of first repeated data. Then, in step 1133, the reception side compares a reception sequence of the second repeated data with the reception sequence (nidx) of the first repeated data.

If the reception sequence of the second repeated data is less than the reception sequence (nidx) of the first repeated data, in step 1135, the reception side determines that a current data process is a repetition first write because the second repeated data is first input data. Then, in step 1125, the reception side updates the output buffer write position (wr_addr) by subtracting the number (rn) of repeated data from the calculated input sequence (dint_idx), writes the input data in the position indicated by the updated output buffer write position (wr_addr), and increases the input buffer read position (rd_addr) by '1' and then, proceeds next step 1147. The output buffer RW flag information (rw_flag) is set as 'WRITE'.

If the reception sequence of the second repeated data is more than the reception sequence (nidx) of the first repeated data, in step 1141, the reception side determines that a current data process is a repetition first read because the second repeated data is last input data.

Then, in step 1143, the reception side updates the output buffer write position (wr_addr) by subtracting the number (rn) of repeated data from the calculated input sequence (dint_idx), changes the output buffer RW flag information (rw_flag) into 'READ', and reads data of a position indicated by the updated output buffer write position (wr_addr) and then, proceeds to next step 1147.

In step 1147, the reception side determines if all data of the input buffer are completely processed. If they are not completed, in step 1145, the reception side sets the determination result on the current data process as a previous repetition determination result and then, returns to step 1103 and again performs its subsequent steps.

If all the data of the input buffer are completely processed, the reception side terminates the process of an exemplary embodiment of the present invention.

Figure 13:
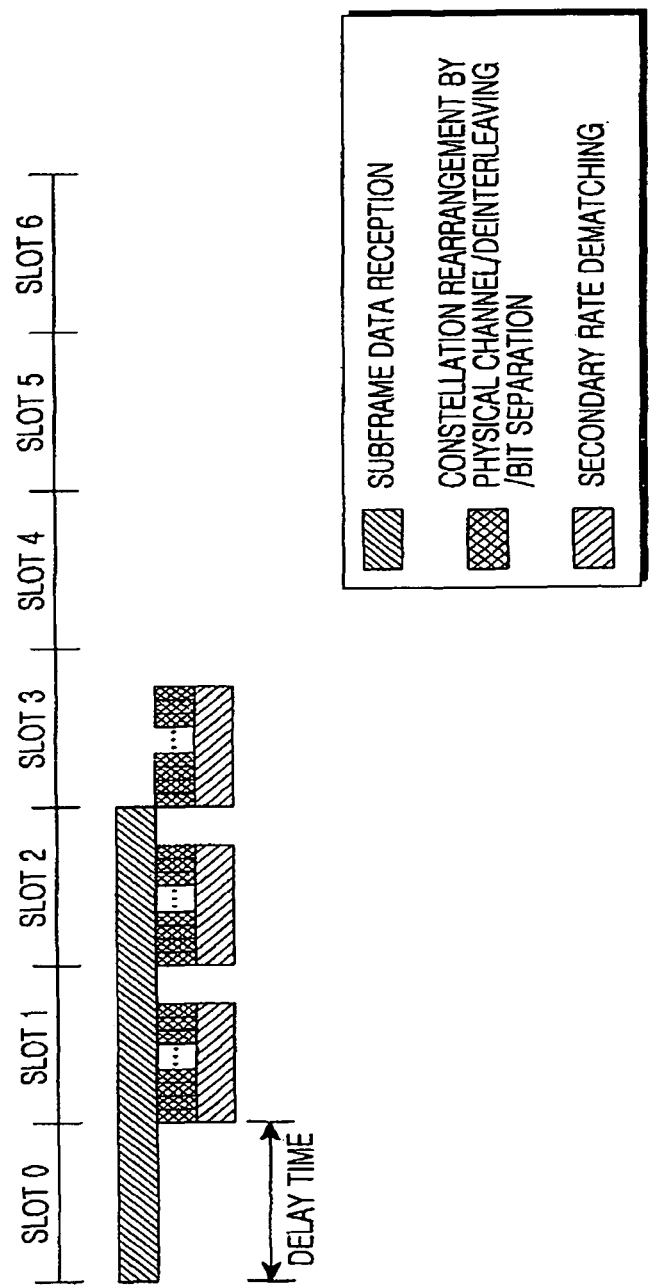
FIG. 13 is a diagram illustrating a start time of a rate dematching operation at a reception side of a communication system according to an exemplary embodiment of the present invention.

FIG. 13 is a diagram illustrating a start time of a rate dematching operation at a reception side of a communication system according to an exemplary embodiment of the present invention.

As shown in FIG. 13, though only one slot is received without completing of the reception of a subframe corresponding to three slots, an exemplary embodiment of the present invention performs constellation rearrangement, HS-DSCH deinterleaving, and bit separation for the one slot and performs an operation for secondary rate dematching. Thus, unlike the conventional art, an exemplary embodiment of the present invention has an effect of being capable of reducing a process delay time taken until before a start of the secondary rate dematching.

As described above, an exemplary embodiment of the present invention can reduce a size of a memory by removing an input buffer for storing one-subframe data from the conventional art. For example, assuming that number of bits per data is equal to 8 bits in an HS-DSCH channel, a size of an input buffer removed is equal to 28.8 Kbytes. In the conventional art, assuming that rate dematching operation is not completed until next subframe data is input to an input buffer, the input buffer has to have a size being capable of storing two subframes. However, unlike the conventional art, an exemplary embodiment of the present invention requires only an input buffer for two slots as shown in FIG. 13.

Also, the conventional art performs two data processes of, upon retransmission, performing a previous transmission read for each of five kinds of data processes such as a puncture, a puncture general, a repetition first write, a repetition last write, and a repetition general and then, performing retransmission combination with corresponding output. Thus, a time taken for rate dematching and Hybrid Automatic Repeat reQuest (HARQ) retransmission data combination is consumed twice as long as an operation time upon initial transmission.

Unlike this, an exemplary embodiment of the present invention processes initially transmitted data into a puncture general in a '0' insertion mode and writes the data in an output buffer and, if there is punctured data after the data, writes '0' through a puncture data process. When a retransmitted data processing result is equal to '0', there is no change though the initially transmitted data is combined with retransmitted data. Thus, an exemplary embodiment of the present invention does not perform an operation of combining the initially transmitted data with the retransmitted data for the punctured data. That is, when processing retransmitted data, an exemplary embodiment of the present invention does not insert '0' in a punctured data position and performs rate dematching only for input data having no puncture, that is, puncture general data. Thus, a time taken for the rate dematching and HARQ retransmission data combination is consumed twice as long as a result of subtracting number of punctured data from an operation time on initial transmission. That is, when operating in a '0' insertion mode, an exemplary embodiment of the present invention less consumes an operation time by a time corresponding to twice as much as the punctured data compared to the conventional art.

An exemplary embodiment of the present invention calculates an error through a data input sequence and, prior to completion of deinterleaving, performs rate dematching in a communication system, thus being able to reduce a delay time taken to start the rate dematching, and reduce a memory size through removal of an input buffer storing subframe data.

While the invention has been shown and described with reference to certain preferred embodiments thereof, it will be understood by those skilled in the art that various changes in form and details may be made therein without departing from the spirit and scope of the invention as defined by the appended claims.

The invention claimed is:

1. An apparatus for rate dematching, comprising:
   a processor for calculating rate dematching parameters for current data, the parameters including an order among a data sequence before interleaving and an error based on the calculated order;
   a selector for receiving a current data, a previous data, and an output data; and
   a state machine circuit for receiving the calculated rate dematching parameters and controlling the selector based on the calculated rate dematching parameters to selectively perform at least one of a puncturing process and a repetition process.

2. The apparatus of claim 1, wherein the processor generates an address after bit position exchange, an address after High-Speed Downlink Shared CHannel (HS-DSCH) deinterleaving, and an address after bit separation, one by one, and calculates the order before interleaving of the current data.

3. The apparatus of claim 1, wherein the processor calculates the number of data punctured in a rate matcher or the number of repeated data in the rate matcher, and calculates the error using at least one of the number of punctured data, the number of repeated data, a previous error, a preset initial error, and an error offset.

4. The apparatus of claim 3, wherein, when data for a previous error is determined as punctured data, the processor calculates the error by adding an error offset preset for the punctured data to the previous error.

5. The apparatus of claim 3, wherein the processor calculates a minimum 'N' allowing a value adding the error offset to an initial error value at 'N' times to become a preset value or more, and determines the calculated 'N' as the number of punctured data or the number of repeated data, and
when the data for the previous error is not determined as the punctured data, the processor calculates the error by adding an error offset preset for the punctured data or an error offset preset for the repeated data, to the initial error at 'N' times.

6. The apparatus of claim 1, wherein, when rate dematching data punctured in a rate matcher, the state machine circuit compares the error value with a preset first threshold value and, when the error value is greater than the first threshold value, the state machine circuit determines the current data as original data and outputs the current data.

7. The apparatus of claim 6, wherein the state machine circuit compares the error value with the preset first threshold value, and
when the error value is less than or equal to the first threshold value, the state machine circuit determines that punctured data exists between the current data and previously output data, and outputs zero (0).

8. The apparatus of claim 1, wherein, when rate matching data repeated in a rate matcher, the state machine circuit compares the error value with a first threshold value and a second threshold value, and
when the error value is greater than or equal to the first threshold value and is less than or equal to the second threshold value, the state machine circuit determines the current data as original data to which repetition is not applied, and outputs the current data.

9. The apparatus of claim 8, wherein, when the error value is less than the first threshold value or the error value is greater than or equal to the second threshold value, the state machine circuit determines the current data as data to which repetition is applied in a rate matcher, compares order inputted to the rate dematcher with the calculated order, determines whether repeated data corresponding to the current data has been previously output or whether it is in a state of being read after being previously output, and
when the corresponding repeated data is not previously output, outputs the current data.

10. The apparatus of claim 9, wherein, when the corresponding repeated data has been previously output but is not being read, the state machine circuit reads the corresponding repeated data.

11. The apparatus of claim 9, wherein, when the corresponding repeated data is being read, after being output, the state machine circuit combines the read data with the current data, and outputs the combined data.

12. A method for rate dematching, the method comprising:
calculating rate dematching parameters for current data, the parameters including an order among a data sequence before interleaving and an error based on the calculated order; and
selectively performing at least one of a puncturing process and a repetition process based on the calculated rate dematching parameters.

13. The method of claim 12, wherein calculating rate dematching parameters for current data comprises calculating the order, before interleaving of current data, by generating a bit position exchange address, a deinterleaving address, and a bit separation address one by one.

14. The method of claim 12, wherein calculating the rate dematching parameters comprises:
calculating the number of data punctured in a rate matcher or the number of repeated data in the rate matcher using the calculated order; and
calculating the error using at least one of the number of punctured data, the number of repeated data, a previous error, a preset initial error, and an error offset.

15. The method of claim 14, wherein, when data for a previous error is determined as punctured data, calculating the error comprises adding an error offset preset for the punctured data to the previous error.

16. The method of claim 14, wherein calculating the error comprises:
calculating a minimum 'N' allowing a value adding the error offset to an initial error value at 'N' times to become a preset value or more;
determining the calculated 'N' as the number of punctured data or the number of repeated data; and
when the data for the previous error is not determined as the punctured data, adding an error offset preset for the punctured data or an error offset preset for the repeated data, to the initial error at 'N' times.

17. The method of claim 12, wherein selectively performing at least one of the puncturing process and the repetition process comprises:
comparing the error value with a preset first threshold value, when rate dematching data punctured in a rate matcher; and
when the error value is greater than the first threshold value, determining the current data as original data, and outputting the current data.

18. The method of claim 17, further comprising:
when the error value is less than or is equal to the first threshold value, determining that punctured data exists between the current data and previously output data; and
outputting zero (0).

19. The method of claim 12, wherein selectively performing at least one of the puncturing process and the repetition process comprises:
comparing the error value with a first threshold value and a second threshold value, when it is a mode of rate matching data repeated in a rate matcher;
when the error value is greater than or equal to the first threshold value and is less than or equal to the second threshold value, determining the current data as original data to which repetition is not applied; and
outputting the current data.

20. The method of claim 19, further comprising:
when the error value is less than the first threshold value or the error value is greater than or equal to the second threshold value, determining the current data as data to which repetition is applied in a rate matcher;

comparing order input to the rate dematcher with the calculated order;

determining, based on the comparison result, whether repeated data corresponding to the current data has been previously output or whether is being read after being output; and when the corresponding repeated data is not previously output, outputting the current data.

21. The method of claim 20, further comprising reading the corresponding repeated data, when the corresponding repeated data has been previously output but is not being read.

22. The method of claim 20, further comprising:

when the corresponding repeated data is being read after being output, combining the read data with the current data; and outputting the combined data.

* * * * *